(12) United States Patent
Mawhinney et al.

(10) Patent No.: US 7,936,689 B2
(45) Date of Patent: *May 3, 2011

(54) SYSTEM AND METHOD FOR THE MEASUREMENT OF SERVICE QUALITY IN A COMMUNICATION NETWORK

(75) Inventors: Ted Nodine Mawhinney, Clearwater, FL (US); Richard A. Mundwiler, Safety Harbor, FL (US)

(73) Assignee: Paradyne Corporation, Largo, FL (US)

( * ) Notice: Subject to any disclaimer, the term of this patent is extended or adjusted under 35 U.S.C. 154(b) by 1904 days.

This patent is subject to a terminal disclaimer.

(21) Appl. No.: 10/950,801

(22) Filed: Sep. 27, 2004

(65) Prior Publication Data

US 2005/0036447 A1 Feb. 17, 2005

Related U.S. Application Data

(63) Continuation of application No. 09/144,926, filed on Sep. 1, 1998, now Pat. No. 6,798,742.

(60) Provisional application No. 60/071,615, filed on Jan. 16, 1998.

(51) Int. Cl.
*G01R 31/08* (2006.01)
(52) U.S. Cl. ............ 370/252; 370/389; 370/395.21
(58) Field of Classification Search .......... None
See application file for complete search history.

(56) References Cited

U.S. PATENT DOCUMENTS

| | | | |
|---|---|---|---|
| 5,258,979 A * | 11/1993 | Oomuro et al. | 370/232 |
| 5,315,588 A | 5/1994 | Kajiwara et al. | |
| 5,487,061 A | 1/1996 | Bray | |
| 5,521,907 A * | 5/1996 | Ennis et al. | 370/253 |
| 5,654,966 A | 8/1997 | Lester, Jr. et al. | 370/392 |
| 5,809,282 A | 9/1998 | Cooper et al. | |
| 5,848,058 A * | 12/1998 | Ooyoshi et al. | 370/244 |
| 5,987,034 A | 11/1999 | Simon et al. | |
| 6,038,219 A | 3/2000 | Mawhinney et al. | |
| 6,058,102 A * | 5/2000 | Drysdale et al. | 370/252 |
| 6,061,722 A | 5/2000 | Lipa et al. | |
| 6,076,114 A | 6/2000 | Wesley | |
| 6,172,977 B1 * | 1/2001 | Christie et al. | 370/395.61 |
| 6,556,540 B1 | 4/2003 | Mawhinney et al. | 370/229 |

* cited by examiner

*Primary Examiner* — Duc C Ho
(74) *Attorney, Agent, or Firm* — Thomas, Kayden, Horstemeyer & Risley, LLP

(57) ABSTRACT

A system and method for the measurement of communication network performance over a secondary communication channel sends an inquiry signal containing information pertaining to network performance from a near end communication device to a far end communication device. From the inquiry signal the far end communication device can determine the number of packets of information lost through the network. Once received the inquiry signal, a reply signal with additional information is sent to the near end communication device. The near end communication device receives the reply signal and can determine therefrom various network performance parameters.

18 Claims, 8 Drawing Sheets

SYSTEM AND METHOD FOR THE MEASUREMENT OF SERVICE QUALITY IN A COMMUNICATION NETWORK

CROSS REFERENCE TO RELATED APPLICATION

This application is a continuation of application Ser. No. 09/144,926, filed Sep. 1, 1998, now U.S. Pat. No. 6,798,742 which claims the benefit of U.S. Provisional Application No. 60/071,615, filed Jan. 16, 1998. Application Nos. 60/071,615 and 09/144,926 are hereby incorporated by reference.

FIELD OF THE INVENTION

The present invention relates generally to data communications, and more particularly, to a system and method for the measurement of service quality over a communication network.

BACKGROUND OF THE INVENTION

Historically, in the field of data communications, a modem, a data service unit (DSU), or a channel service unit (CSU) has been used to convey information from one location to another. Digital technology now enables modems and other communication devices, such as frame relay data service units (DSU's) and frame relay access units (FRAU's) to communicate large amounts of data at higher speeds. The communication scheme employed by these devices generally adheres to a model, known as the Open Systems Interconnect (OSI) Seven-Layer model. This model specifies the parameters and conditions under which information is formatted and transferred over a given communications network. A general background of the OSI seven-layer model follows.

In 1978, a framework of international standards for computer network architecture known as "OSI" (Open Systems Interconnect) was developed. The OSI reference model of network architecture consists of seven layers. From the lowest to the highest, the layers are: (1) the physical layer; (2) the datalink layer; (3) the network layer; (4) the transport layer; (5) the session layer; (6) the presentation layer; and (7) the application layer. Each layer uses the layer below it to provide a service to the layer above it. The lower layers are implemented by lower level protocols which define the electrical and physical standards, perform the byte ordering of the data, and govern the transmission, and error detection and correction of the bit stream. The higher layers are implemented by higher level protocols which deal with, inter alia, data formatting, terminal-to-computer dialogue, character sets, and sequencing of messages.

Layer 1, the physical layer, controls the direct host-to-host communication between the hardware of the end users' data terminal equipment (e.g., a modem connected to a PC).

Layer 2, the datalink layer, generally fragments the data to prepare it to be sent on the physical layer, receives acknowledgment frames, performs error checking, and re-transmits frames which have been incorrectly received.

Layer 3, the network layer, generally controls the routing of packets of data from the sender to the receiver via the datalink layer, and it is used by the transport layer. An example of the network layer is the Internet Protocol (IP), which is the network layer for the TCP/IP protocol widely used on Ethernet networks. In contrast to the OSI seven-layer architecture, TCP/IP (Transmission Control Protocol over Internet Protocol) is a five-layer architecture which generally consists of the network layer and the transport layer protocols.

Layer 4, the transport layer, determines how the network layer should be used to provide a point-to-point, virtual, error-free connection so that the end point devices send and receive uncorrupted messages in the correct order. This layer establishes and dissolves connections between hosts. It is used by the session layer. TCP is an example of the transport layer.

Layer 5, the session layer, uses the transport layer and is used by the presentation layer. The session layer establishes a connection between processes on different hosts. It handles the creation of sessions between hosts as well as security issues.

Layer 6, the presentation layer, attempts to minimize the noticeability of differences between hosts and performs functions such as text compression, and format and code conversion.

Layer 7, the application layer, is used by the presentation layer to provide the user with a localized representation of data which is independent of the format used on the network. The application layer is concerned with the user's view of the network and generally deals with resource allocation, network transparency and problem partitioning.

The communications networks that operate within the OSI seven-layer model include a number of paths or links that are interconnected to route voice, video, and/or digital data (hereinafter, collectively referred to as "data") traffic from one location of the network to another. At each location, an interconnect node couples a plurality of source nodes and destination nodes to the network. In some cases, the sources and destinations are incorporated in a private line network that may include a series of offices connected together by leased-lines with switching facilities and transmission equipment owned and operated by the carrier or service provider and leased to the user. This type of network is conventionally referred to as a "circuit-switching network". Accordingly, a source node of one office at one location of the network may transmit data to a destination node of a second office located at another location of the network through their respective switching facilities.

At any given location, a large number of source nodes may desire to communicate through their respective switching facilities, or interconnect node, to destination nodes at various other locations of the network. The data traffic from the various source nodes is first multiplexed through the source switching facility, and then demultiplexed at the destination switching facility, and finally delivered to the proper destination node. A variety of techniques for efficiently multiplexing data from multiple source nodes onto a single circuit of the network are presently employed in private line networks. For instance, time division multiplexing (TDM) affords each source node full access to the allotted bandwidth of the circuit for a small amount of time. The circuit is divided into defined time segments, with each segment corresponding to a specific source node, to provide for the transfer of data from those source nodes, when called upon, through the network.

Other data communications systems, in contrast, have not been as successful with employing multiplexing techniques to further enhance network efficiency. In particular, frame-relay networks offer fewer alternatives than their circuit-switching network counterparts. Frame-relay networks are one implementation of a packet-switching network. Packet-switching networks, as opposed to circuit-switching networks, allow multiple users to share data network facilities and bandwidth, rather than providing a specific amount of dedicated bandwidth to each user, as in TDM. Instead, packet switches divide bandwidth into connectionless, virtual circuits. Virtual circuits can be permanent virtual circuits (PVC's) or switched virtual circuits (SVC's). As is known, virtual circuit bandwidth is consumed only when data is actually transmitted. Otherwise, the bandwidth is not used. In this way, packet-switching networks essentially mirror the operation of a statistical multiplexer (whereby multiple logical users share a single network access circuit). Frame relay generally operates within layer 2 (the data link layer) of the OSI model, and is an improvement over previous packet switching techniques, such as the industry standard X.25, in that frame relay requires significantly less overhead.

In frame relay networks, as in all communication networks, access to the network is provided by a network service provider. These service providers generally provide the communication and switching facilities over which the above-mentioned communication devices operate. Typically, an end user desirous of establishing a communications network, provisions the network services in the form of a public switched service network. An example of a public switched network is the public switched telephone network (PSTN) or a public data network (PDN). These public networks typically sell network services, in the form of connectivity, to end users.

Typically a user of a public network will purchase a particular level of service from the network service provider. This level of service can be measured by, for example, network availability as a percentage of total time on the network, the amount of data actually delivered through the network compared to the amount of data attempted, or possibly the network latency, or the amount of time it takes for a particular communication to traverse the network.

One problem with current communication systems is that it is difficult for an end user to adequately determine whether the public network service provider is delivering the quality of service that the end user has contracted. This is because it is nearly impossible for an end user to adequately measure the level of service actually delivered by the public network.

Therefore, it would be desirable to provide a system and method that will allow an end user of a public network to adequately measure the level of service delivered by the network over which their communication system is operating.

SUMMARY OF THE INVENTION

The present invention provides an improvement to a communication environment by enabling a communication device to measure, over a secondary communication channel, various network performance parameters in order to measure the performance of the network over which the communication device is operating.

This task is accomplished by providing a system for measuring network performance parameters over a secondary communication channel comprising a communication device configured to send an inquiry signal to another communication device connected on the network. The recipient communication device is further configured to reply to the inquiry signal with a reply signal. Information contained within the inquiry signal and the reply signal enables the communication device to perform calculations in order to determine the service quality level of the network.

The present invention can also be conceptualized as providing a method for measuring network performance parameters over a secondary communication channel comprising the following steps. First a communication device sends an inquiry signal to a receiving communication device. The receiving communication device performs calculations based upon the information contained in the inquiry signal in order to determine certain network performance parameters. The receiving communication device then sends a reply signal to the originating communication device. The originating communication device receives the reply signal and performs calculations based upon the information contained in the inquiry signal in order to determine certain network performance parameters.

The invention has numerous advantages, a few of which are delineated hereafter, as merely examples.

An advantage of the present invention is that it allows a communication device to measure, over a secondary communication channel, the performance of a service network, thereby consuming no additional bandwidth in order to perform the measurement.

Another advantage of the present invention is that it allows the end user of a communication network to measure the availability of communication devices connected to the network.

Another advantage of the present invention is that it allows the number of frames/octets discarded by a communication network to be determined.

Another advantage of the present invention is that it allows the latency of a communication network to be measured.

Another advantage of the present invention is that it is simple in design, reliable in operation, and its design lends itself to economical mass production in communication devices.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings. The components within the drawings are not necessarily to scale relative to each other, emphasis instead being placed on clearly illustrating the principles of the present invention.

DETAILED DESCRIPTION OF THE PREFERRED EMBODIMENT

The service quality measurement logic of the present invention can be implemented in software, hardware, or a combination thereof. In a preferred embodiment, the service quality measurement logic is implemented in software that is stored in a memory and that is executed by a suitable microprocessor (uP) situated in a communications device. However, the service quality measurement program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Furthermore, the preferred embodiment of the service quality measurement logic is illustrated in the context of a frame relay communications network; however, the concepts and principles of the service quality measurement logic are equally applicable to other communication techniques, such as asynchronous transfer mode (ATM) or X.25.

Figure 1:
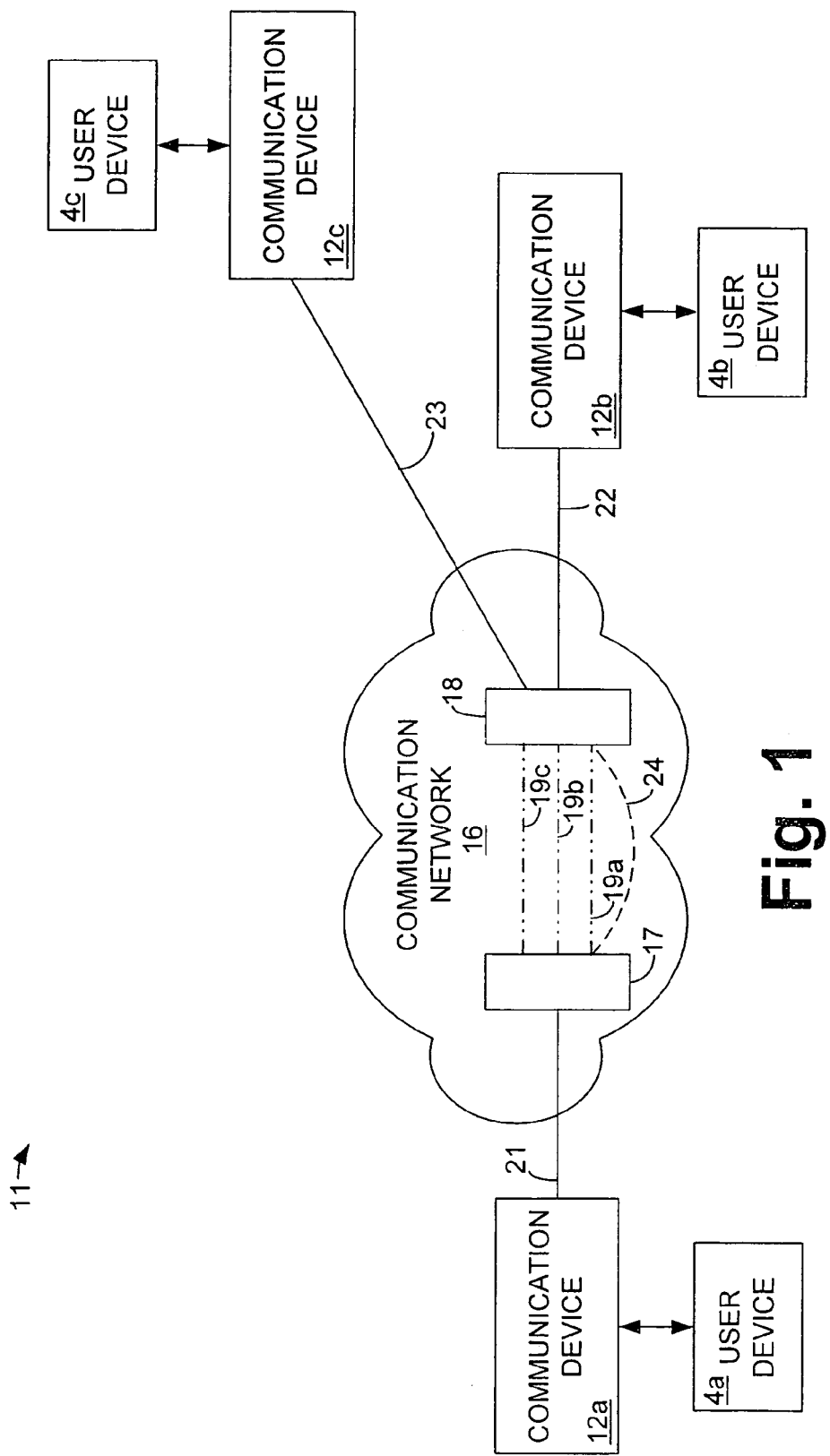
FIG. 1 is a block diagram of a network model illustrating the framework within which the present invention resides.

FIG. 1 shows a communication topography 11 in which communications devices containing the service quality measurement logic operate. In general, the communications environment includes a plurality of user devices 4a, 4b, and 4c each connected to a plurality of communication devices 12a, 12b, and 12c respectively. For simplicity only three FRAU's are depicted in FIG. 1. In practice, communication environment 11 will contain many communication devices. In the preferred embodiment, communication devices 12a, 12b, and 12c are illustratively frame relay access units (FRAU's). FRAU's 12a, 12b, and 12c are considered communication endpoints and communicate over communication network 16, in a conventional manner. Communication network 16 can be for example any public network that provides connectivity for FRAU's 12a, 12b, and 12c, and in the preferred embodiment is a frame relay communication network. Communication network 16 illustratively connects to FRAU's 12a, 12b and 12c over connections 21, 22 and 23 respectively. Connections 21, 22 and 23 can be physical links and can be, for exampl, T1/E1 service or any digital data service (DDS).

Communication network 16 is typically characterized by a mesh network of links (not shown) interconnecting a matrix of intermediate nodes (not shown) through frame relay switches 17 and 18. For simplicity only two frame relay switches are illustrated herein; however, communication network 16 will typically contain many switching devices. The links are identified by data link connection identifiers (DLCI's), which are used to identify the logical connection over which the subject data is transported. The use of DLCI's allows multiple logical connections to be multiplexed over the same channel. Alternatively, in the case of an asynchronous transfer mode (ATM) network, virtual path identifiers/virtual channel identifiers (VPI's/VCI's) are used to identify the logical connection over which the subject data is transported.

Information is communicated over the communication network 16 in discrete packets, which may be time multiplexed across shared or common communication links. For example, FRAU 12a may communicate with FRAU 12b over a predefined communication path or link within the frame relay network. This communication path will generally be defined by a number intermediate nodes. The communication link that interconnects FRAU 12a and FRAU 12b may be completely separate and distinct from that which interconnects FRAU 12a and 12c. Alternatively, a segment of the two above-described communication links may be shared. Whether the links are separate or shared is a function of a number of factors, and generally is determined by the service provider.

Within communication network 16 the communication path between FRAU 12a and FRAU 12b, for example, will be the same in both directions. That is, data transmitted from FRAU 12a to FRAU 12b will traverse the same path (i.e., interconnecting, intermediate nodes) as will data transmitted from FRAU 12b to FRAU 12a. This path of intermediate nodes is defined by DLCI's, and is commonly referred to as a permanent virtual circuit (PVC). This name derives from the fact that the circuit is permanent in that it does not change from transmission to transmission. It is, however, virtual in the sense that a unitary physical connection (such as a dedicated leased line) is not established and maintained between the two end points. If for some reason or another the service provider decides to change the interconnecting path (i.e., reconfigure or redefine the intermediate nodes), the service provider will communicate this changed communication path to the users and a new set of DLCI's will be used in order to properly route the data from end point to end point. DLCI's are assigned to and define all the points in a network through which data passes. For simplicity the service quality measurement logic 100 is described herein as applied to permanent virtual circuits (PVC's); however, the service quality measurement logic 100 is equally applicable to communication networks employing switched virtual circuits (SVC's).

Still referring to FIG. 1, PVC's 19a, 19b, and 19c illustrate the concept of multiple communication paths within communication network 16. Further included in a frame relay communication path, such as PVC 19a and illustrated as secondary communication channel 24, can be an additional multiplexed, secondary channel over which management information can be communicated. Commonly assigned U.S. Pat. No. 5,654,966 entitled "CIRCUIT AND METHOD FOR MULTIPLEXING A FRAME-RELAY VIRTUAL CIRCUIT AND FRAME-RELAY SYSTEM HAVING MULTIPLEXED VIRTUAL CIRCUITS", issued on Aug. 5, 1997, to Lester Jr. et al., describes a secondary channel over which management information can be communicated, and is hereby incorporated by reference. The service quality measurement logic to be described in detail with respect to FIGS. 3, 4, 5, 6, 7, and 8 operates over the above mentioned secondary channel in order to measure the performance of the communication network. In the description hereafter, the present invention will be described in the context of a near end communication device sending a service level verification request message to a far end communication device. The far end communication device performs calculations based upon the information contained in the request message, modifies the message, and returns it to the near end communication device as a service level verification response message. The near end communication device receives the response message from the far end device and performs additional network service quality level calculations. Any device mentioned herein may be both the near end device and the far end device.

Figure 2:
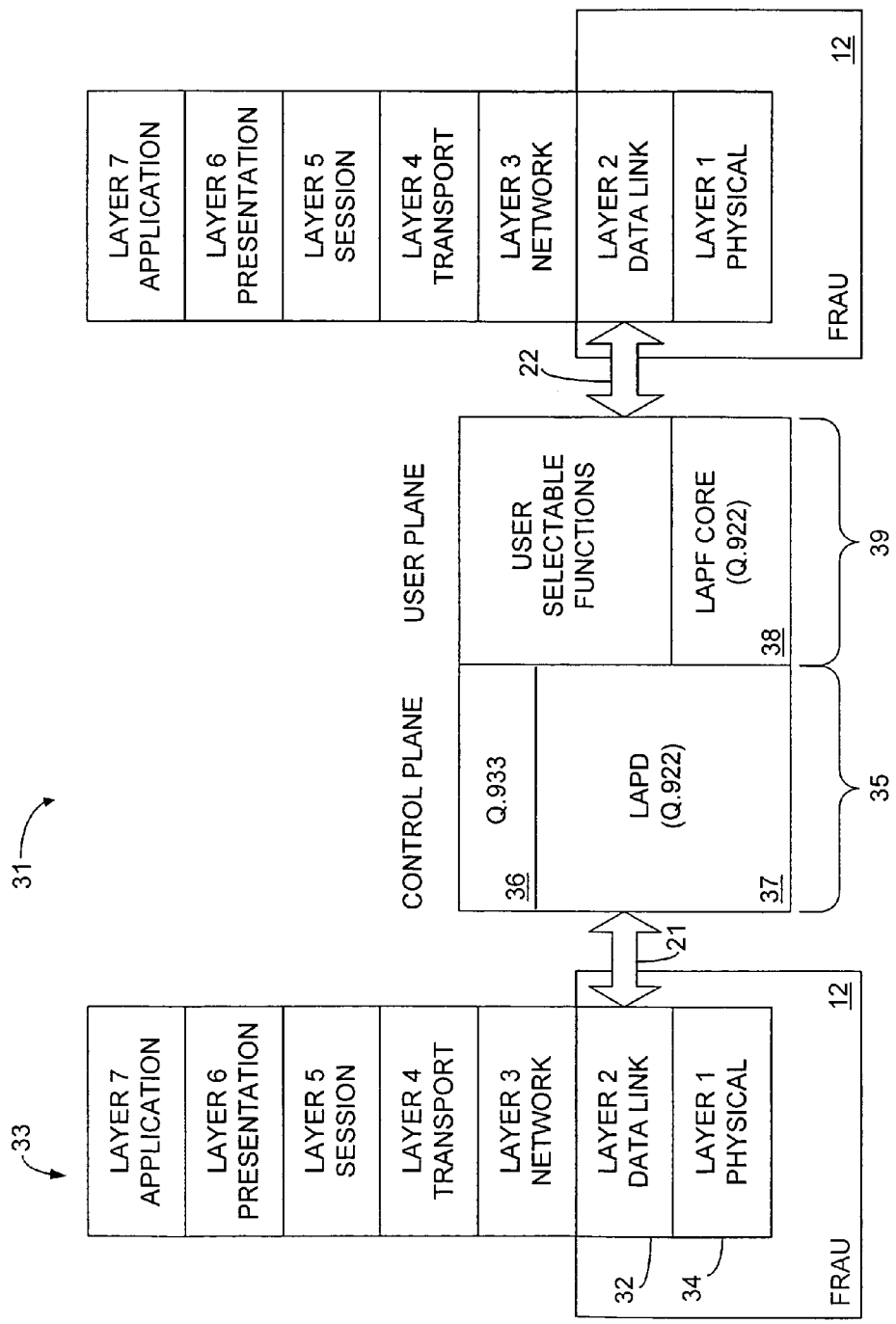
FIG. 2 is a schematic view illustrating the layers of the OSI seven layer model in which devices employing the service quality measurement logic of the present invention operate.

FIG. 2 shows a block diagram of a network model 31 illustrating the framework within which the present invention resides. The logic of the present invention resides within each frame relay access unit (FRAU) 12. FRAU 12 is typically the device that connects user equipment to a frame relay network. FRAU 12 typically communicates over a frame relay network using layer 2, or the data link layer 32, of the OSI seven layer model 33. FRAU 12, however, is also aware of layer 1, or the physical layer 34 of the OSI 7-layer model, since it contains a physical layer access device, such as a DSU.

Contained at the data link layer 32 are the standards and protocols (including the logical management interface (LMI)) that enable the transport of frame relay data. The protocol architecture that supports frame relay transport can be considered to reside in two planes of operation. The control plane 35 and the user plane 39. The control plane allows signaling to control the establishment and termination of transportation services on the user plane. At the data link layer 32, LAPD (Q.922) (ISDN Data Link Layer Specification For Frame Mode Bearer Services) 37 is used to provide a reliable data link control service with error control and flow control. This data link control service is used for the exchange of Q.933 control signaling messages 36. For the transfer of information between end users, the user plane 39 protocol is LAPF CORE (Q.922 CORE) (Annex A-Core Aspects Of Recommendation Q.922 For Use With Frame Relay Bearer Service) 38. The protocol Q.922, among other things, includes an address header that is applied to a data packet and provides the addressing for the frame relay packet.

The physical layer includes the hardware connections and physical media that enable the transport of information over the network.

Figure 3:
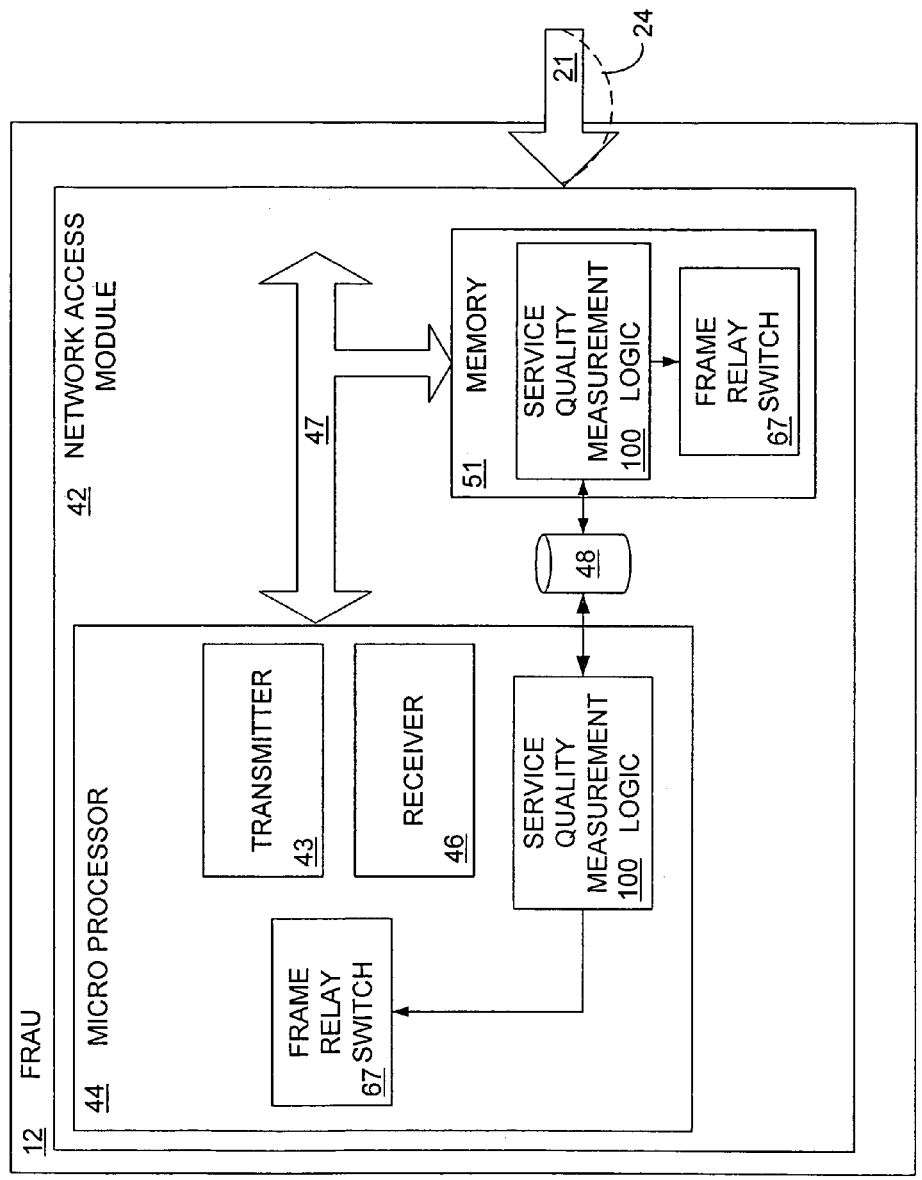
FIG. 3 is a block diagram illustrating a communication device employing the service quality measurement logic of the present invention.

Referring now to FIG. 3, shown is a schematic view illustrating a communications device, for example but not limited to, a frame relay access unit (FRAU) 12, containing the service quality measurement logic 100 of the present invention. FRAU 12 contains network access module (NAM) 42, which includes a number of conventional components that are well known in the art of data communications. Microprocessor (uP) 44 is configured to control the operation of the FRAU's transmitter 43, receiver 46, and frame relay switch 67 and is configured to couple to memory 51 over bus 47.

Communication channel 21 is typically the physical wire that extends from a frame relay network and connects to NAM 42 to provide access into a frame relay, or other communication network. However, communication channel 21 can be any medium for connecting the FRAU 12 to a communication network. Secondary channel 24 exists within each data link connection identifier (DLCI), which in turn exist over communication channel 21. Secondary channel 24 carries management and control information, which may include information relating to the service quality measurement of the present invention. The secondary channel operates in accordance with that disclosed in commonly assigned U.S. Pat. No. 5,654,966 to Lester, Jr. et al., mentioned hereinabove. Also included in FRAU 12 is memory 51 which includes the service quality measurement logic 100 of the present invention and frame relay switch 67. Service quality measurement logic 100 is configured to enable and drive uP 44 to allow the measurement of the performance of communication devices 12a, 12b, and 12c over communication network 16 of FIG. 1. FRAU's 12a, 12b, and 12c cooperate in the service quality measurement in that one FRAU (12a for example) might send a service level request to another FRAU (12b for example). In this example, FRAU 12b would receive the service level request message, perform service verification calculations (to be described in detail with reference to FIGS. 5, 6, 7, and 8) and reply to FRAU 12a. FRAU 12a would receive the response from FRAU 12b and perform additional calculations to determine the service level provided by the particular communication network through which FRAU 12a and FRAU 12b are communicating. Illustratively, the service quality measurement logic 100 of the present invention resides in all FRAU's. Because service quality measurement logic 100 is an algorithm that is executed by uP 44, it is depicted as residing within both memory 51 and uP 44. Similarly, frame relay switch 67 resides in memory 51 and executes in uP 44.

Also included in FRAU 12 is statistics database 48. Statistics database 48 communicates with service quality measurement logic 100 in order to provide service level verification measurement storage information.

Figure 4:
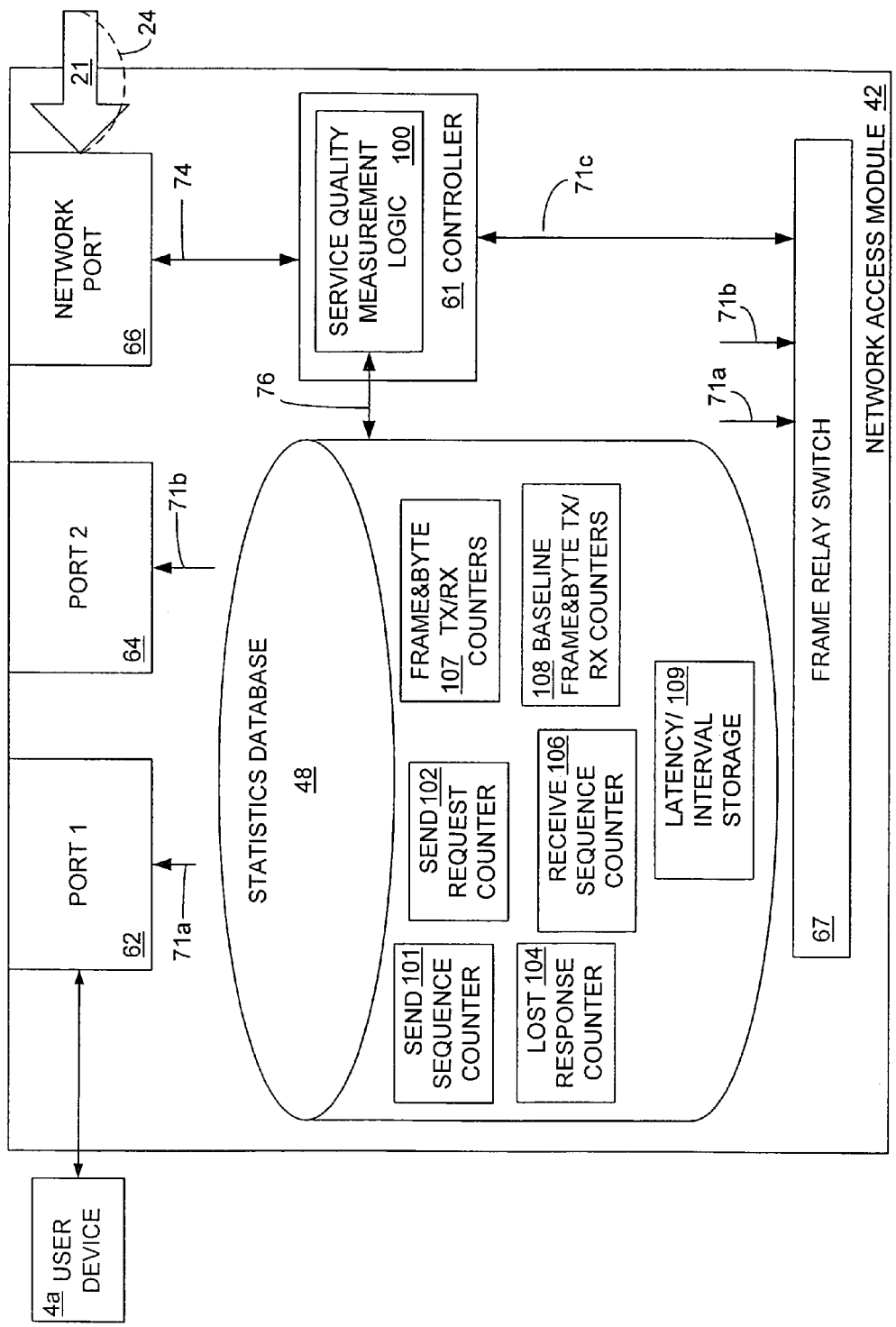
FIG. 4 is a block diagram view illustrating the network access module of FIG. 3 including the service quality measurement logic.

FIG. 4 shows a block diagram view illustrating the network access module of FIG. 3 including the service quality measurement logic 100. Network access module (NAM) 42 illustratively includes communication port 62 (port 1), communication port 64 (port 2), and network port 66. NAM 42 may contain fewer or additional ports and ports 62, 64 and the network port 66 are shown for illustrative purposes only. Ports 62 and 64 each connect to frame relay switch 67 through connections 71a and 71b respectively. Network port 66 connects to frame relay switch 67 through service quality measurement logic 100 on connections 74 and 71c. Illustratively, network port 66 connects to communication channel 21 and port 62 (port 1) connects to user device 4a.

The operation of frame relay switch 67 will be discussed hereafter. Frame relay switch 67 exchanges service quality level information with controller 61, which contains the service quality measurement logic 100 of the present invention, through connection 71c.

Controller 61 contains the service quality measurement logic 100 that enables FRAU 12 to send and receive service level request information to other communication devices, and to perform the service quality level measurement calculations through which a communication device may determine the performance of the network to which it is attached.

Service quality measurement logic 100 communicates over connection 76 with statistics database 48. Statistics database 48 includes send sequence counter 101, send request counter 102, lost response counter 104, receive sequence counter 106, frame and byte transmit/receive counters 107, baseline frame and byte transmit/receive counters 108 and latency/interval storage device 109. While shown in FIG. 4 as single blocks for simplicity, the frame and byte transmit/receive counter 107 and the baseline frame and byte transmit/receive counter 108 are each implemented as four individual counters. For example, frame and byte transmit/receive counter 107 contains a counter for frame transmit, frame receive, byte transmit and byte receive.

In this manner, the service measurement logic 100 of the present invention can determine the level of service provided by the communication network. For example, the availability of the far end communication device may be determined. Additionally, the number of frames/octets discarded by the communication network during a time interval may be determined. Furthermore, the periodic round trip latency of a communication packet may be determined and configuration and addressing information pertinent to a far end communication device may also be determined.

Figure 5:
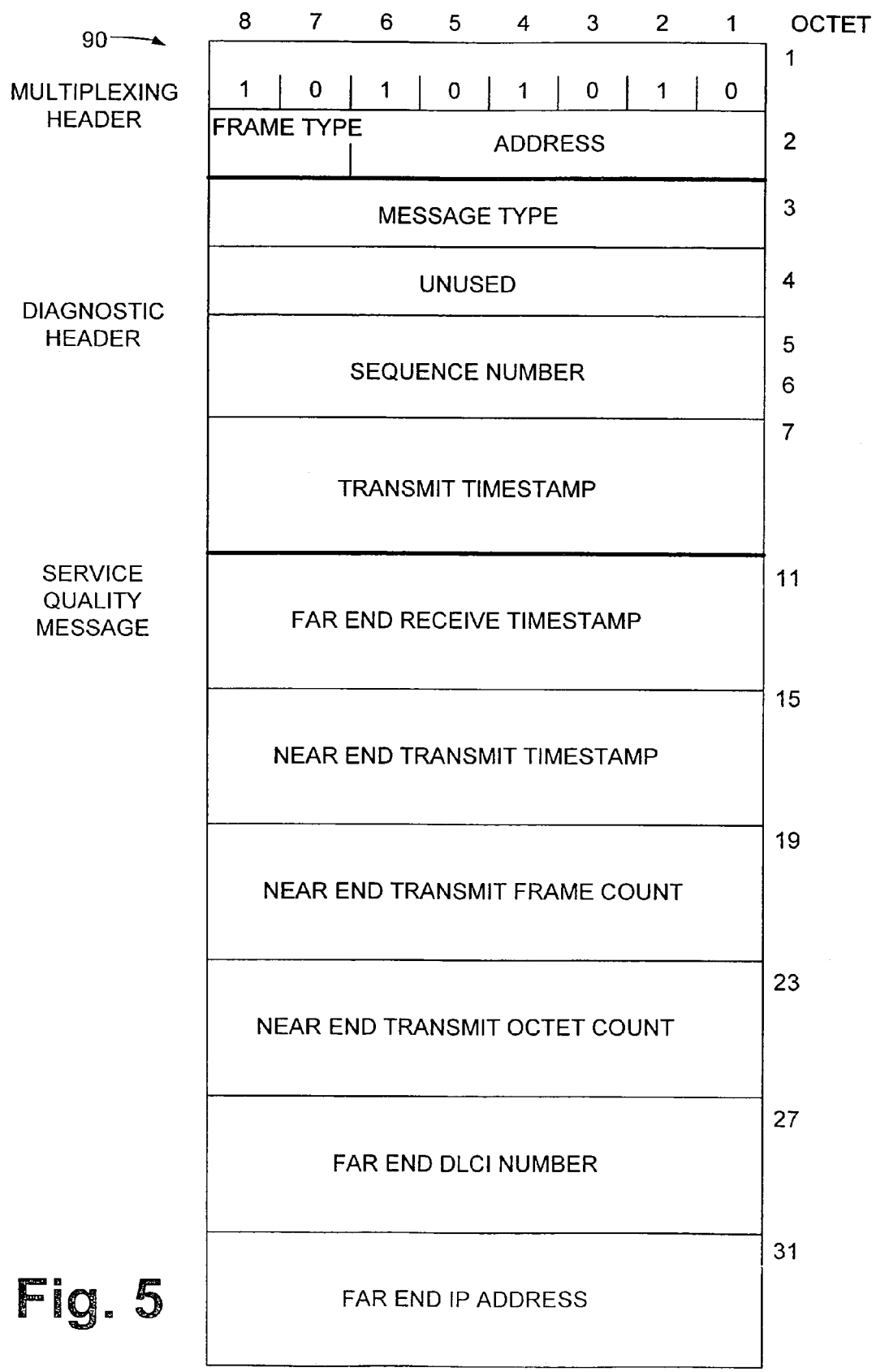
FIG. 5 illustrates the service quality measurement message format employed by the service quality measurement logic of FIG. 4.

FIG. 5 illustrates the service quality measurement message format employed by the service quality measurement logic of FIG. 4. A multiplexing header occupying octets 1 and 2 of service level verification message 90 contains information relating to the type of frame and to the address of the frame. The frame type is specified as a multiplexed frame and the address is that of a diagnostic (or secondary) channel 24 referred to in the aforementioned U.S. Patent to Lester Jr. et al.

In the following description, the service level verification message 90 used by the service quality measurement logic 100 of FIG. 4 will be sent from a near end communication device to a far end communication device. Either device may be the originator of the message. Furthermore, when sent by a near end communication device the service measurement message takes the form of a "service level verification request" message, and when replied to by a far end communication device, takes the form of a "service level verification response" message.

In the preferred embodiment, the diagnostic header occupying octets 3 through 10 includes fields which determine the message type, sequence number, and the transmit timestamp. The message type field (octet 3) determines whether the message is a service level verification request, in which case the message type is given by 0x03, or whether the message is a service level verification response, in which case the message type is given by 0x04. The fourth octet is unused as a pad to even boundary.

Octets 5 and 6 define the sequence number, which is illustratively the current service level verification sequence number of the originator of this message for this DLCI. Octets 7 through 10 contain the transmit timestamp, which represents the time that the message was sent by the originator.

Following the diagnostic header and occupying octets 11 through 34 is the service quality measurement message. Octets 11-14 contain the far end receive timestamp, which is the current counter position of the far end communication device upon receipt of the service level verification request message. The far end communication device is the device that is being queried by the communication device desirous of determining the level of service being achieved over the communication network.

Octets 15-18 contain the near end transmit timestamp, which is the current counter position of the originator of the service level verification request message. When the message is returned to the originator as a service level verification response message, the transmit timestamp in the diagnostic header is copied into this field.

Octets 19-22 contain information corresponding to the near end communication device transmit frame count in which the current count of frames transmitted on the circuit by the originator of the service level verification request message at the point when the message was transmitted is maintained.

Octets 23-26 contain information corresponding to the near end communication device transmit octet count. This field defines the current count of octets transmitted on the circuit by the message originator at the time the message was transmitted.

Contained within octets 27-30 of the message is the DLCI number of the far end communication device. This field is unused in a service level verification request message. When the message is returned as a service level verification response, the far end communication device updates the message with it's DLCI number.

Finally, contained within octets 31-34 is the IP (Internet Protocol) address of the far end communication device. This field is also unused in a service level verification request message. When the message is returned as a service level verification response, the far end communication device will update the message with it's IP address.

Figure 6:
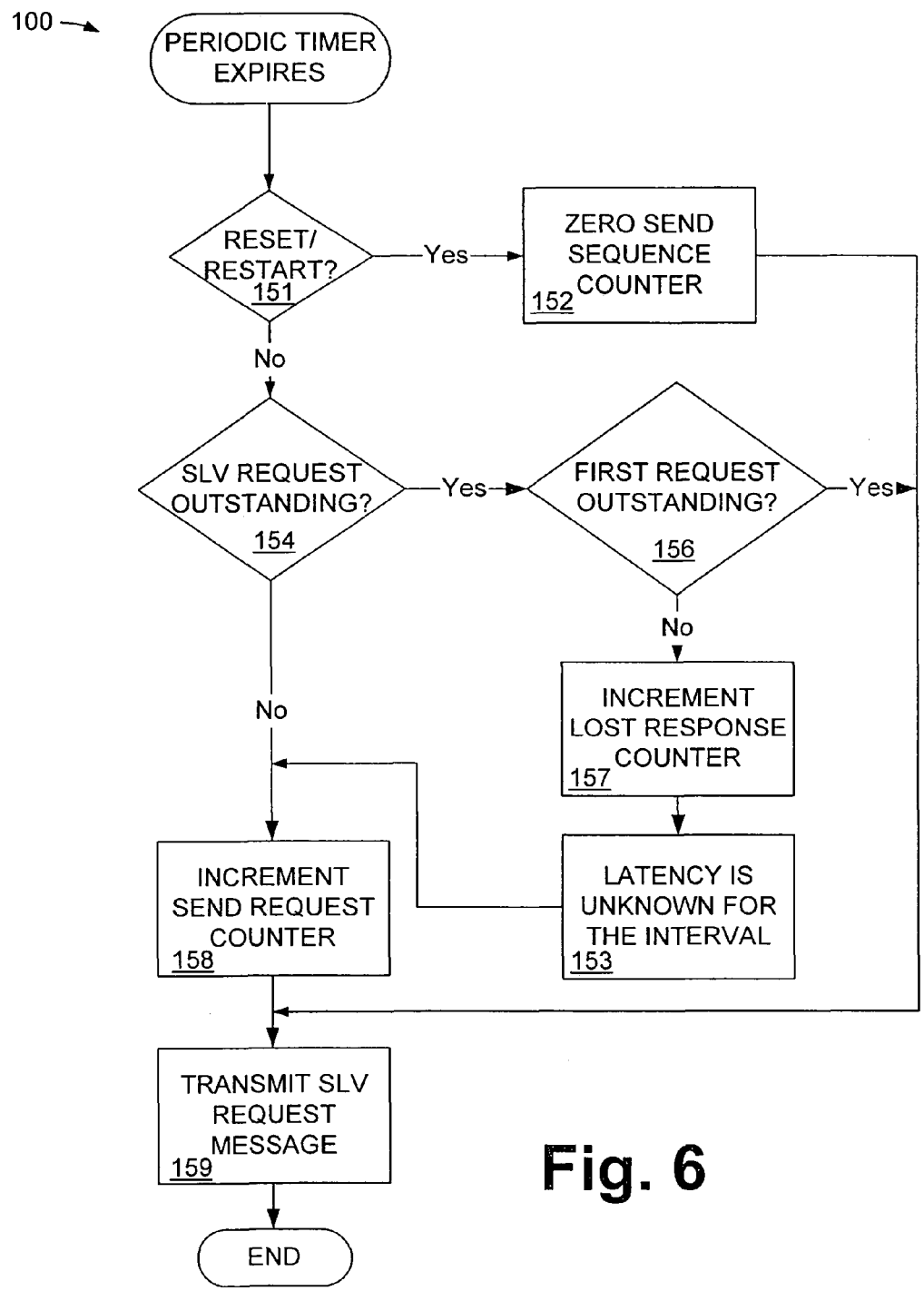
FIG. 6 is a flow diagram illustrating the operation of the service quality measurement logic of FIGS. 3 and 4 as applied to a service level verification request message.

FIG. 6 is a flow diagram 100 illustrating the operation of the service quality measurement logic of FIGS. 3 and 4 as applied to a service level verification request message.

In decision block 151 it is determined whether the current service level verification request message is to be sent following a reset or a restart of the circuit over which communication is to take place. If the current request message is the first after a reset or restart, then in block 152 the send sequence counter 101, of FIG. 4, is zeroed. The send sequence counter maintains the value to be placed in the sequence number field (FIG. 5) of the next transmitted service level verification message. If not, then in decision block 154 it is determined whether there is a service level verification request outstanding. If there is a service level verification request outstanding, then in decision block 156 it is determined whether the outstanding service level verification request is the first one outstanding. If it is, then it is transmitted in block 159 as a service level verification request message.

If it is determined in decision block 154 that there is no service level verification request outstanding, then in block 158 the send request counter 102 (FIG. 4) is incremented. However, the send sequence counter 101 is not incremented if a service level verification response message (to be described in detail with reference to FIGS. 7 and 8) has never been received.

If in block 156 it is determined that the current service level verification request is not the first request outstanding, then in block 157 the lost response counter 104 (FIG. 4) is incremented, then in block 153, the latency for the current interval is marked as unknown and stored in statistics database 48 in latency/interval storage device 109. After the lost response counter 104 is incremented and the latency/interval is saved in latency/interval storage device 109, then in block 158 the send request counter 102 (FIG. 4) is incremented.

In block 159 the service level verification request message is transmitted to a far end data communication device.

Each time a service level verification request message is transmitted, the value of the send sequence counter 101 (FIG. 4) is placed in the sequence number field (FIG. 5). The send sequence counter 101 is then incremented by one, modulo 65,53. The value of zero is skipped. The current values of the near end transmit frame count (FIG. 5) and near end transmit octet count (FIG. 5) are placed in the corresponding fields of the service level verification message 90 of FIG. 5.

Figure 7:
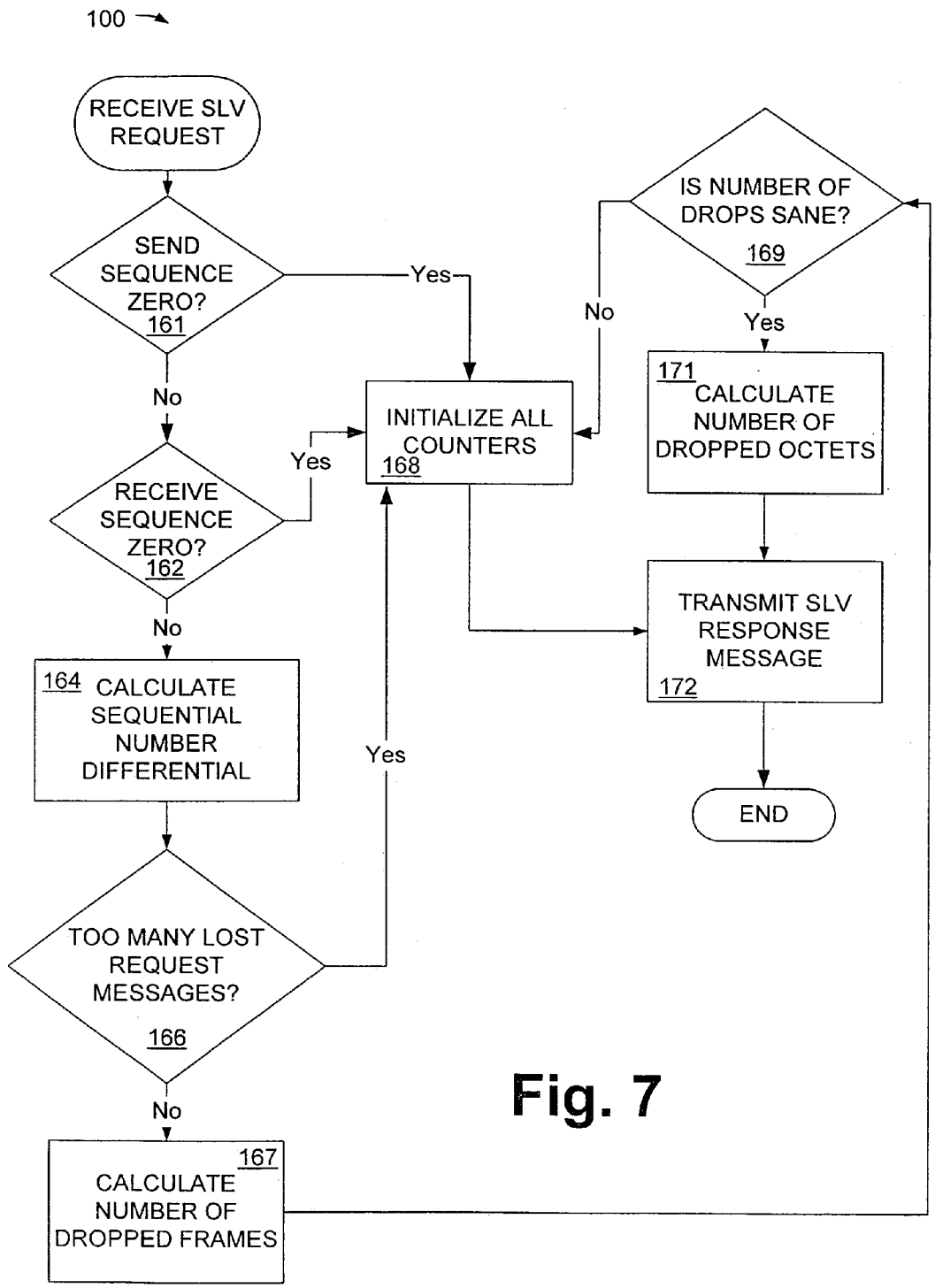
FIG. 7 is a flow diagram illustrating the operation of the service quality measurement logic of FIGS. 3 and 4 as applied to a service level verification response message.

FIG. 7 is a flow diagram illustrating the operation of the service quality measurement logic of FIGS. 3 and 4 as applied to a service level verification response message. In block 161, upon receipt of the service level verification request message transmitted in block 159 of FIG. 6, it is determined whether the send sequence counter 101 (FIG. 4) has been reset to zero. This condition indicates the first service level verification request message sent following a reset/restart (block 151 of FIG. 6). If the send sequence counter 101 is set to zero, then in block 168 all counters are initialized. A send sequence number of zero uniquely identifies the first service level verification request message sent upon circuit activation or reset of the far end communication device. The receive sequence counter 106 (FIG. 4) is set to a value of one. The receive sequence counter 106 maintains the value expected in the sequence number field (FIG. 5) of the next received service level verification message. The counters are initialized by copying the current receive counters 107, of FIG. 4, into the base receive counts 108 of FIG. 4. The current receive counters 107 are a group of counters which maintain the current total number of frames and octets received on the circuit, and the base receive counts 108 are a group of variables which contain the values of the current receive counters when the last service level verification request message was received.

Still referring to block 168, the transmit counts are initialized from the service level verification request message by copying them into the far end base transmit counter 108. The far end base transmit counter 108 maintains the values of the transmit counts in the last received service level verification request message.

If it is indicated in block 161 that the send sequence counter 101 is not set to zero, then in decision block 162 it is decided whether the receive sequence counter 106 (FIG. 4) is set to zero. If the send sequence number (FIG. 5) is non-zero it is subtracted from the value of the receive sequence counter 106 in block 164. If the result is zero, indicating that this is the first service level verification request message received following a reset/restart (block 151 of FIG. 6), then no previous service level verification request messages were dropped by the communication network and the service level verification values can be calculated. If the result is non-zero, the value indicates the number of previous service level verification request messages which were dropped by the network. Should this value exceed an implementation specific threshold, as indicated by decision block 166, no further processing is performed on this particular service level verification request message and the baseline frame and byte transmit/receive counters, 108 of FIG. 4, are initialized. The receive sequence counter 106 is set to the value of the send sequence number plus one.

If it appears that based upon sequence number validation, service level verification calculation is possible, then in block 167 the number of dropped frames is calculated. Next, in decision block 169 it is determined whether the number of dropped frames is sane as calculated in block 167. A sanity check is performed during this calculation in order to detect exceptional conditions, such as a circuit that is in a loopback state. The internal receive counts are a group of calculated variables that contain the total number of frames and octets received during the previous interval. If the number of drops is sane, then, in block 171 the number of dropped octets are calculated. If the result of block 169 is that the number of drops are not sane, then all counters are initialized in block 168. Once the number of dropped octets is calculated then in block 172 the far end communication device will transmit a service level verification response message to the querying device. The aforementioned calculations are carried out as follows.

First the far end interval transmit counts are calculated by subtracting the values of the far end base transmit counts from the corresponding values of the transmit counters in the service level verification request message. The far end interval transmit counts are a group of calculated variables which contain the total number of frames and octets transmitted by the far end communication device during the previous interval.

Next, the interval receive counts are calculated by subtracting the base receive counts from the current receive counters.

Next, the inbound discards are calculated by subtracting the number of frames/characters received during the interval from the number of frames/characters transmitted during the interval. Inbound discards refers to the number of dropped frames as calculated in block 167.

Finally, the current receive counters are copied into the base receive counts. The transmit counts from the service level verification request message are copied into the far end base transmit counters. The service level verification request message is then updated and transmitted back to the querying device as a service level verification response message.

Specifically, the message type field (FIG. 5) in the diagnostic header is changed to response. Next, the transmit timestamp (FIG. 5) from the diagnostic header is copied into the near end transmit timestamp location (FIG. 5). Next, the far end DLCI number and the far end IP address fields (FIG. 5) are updated. Optionally, inbound discards or other pertinent information could be included in the service level verification response message.

Figure 8:
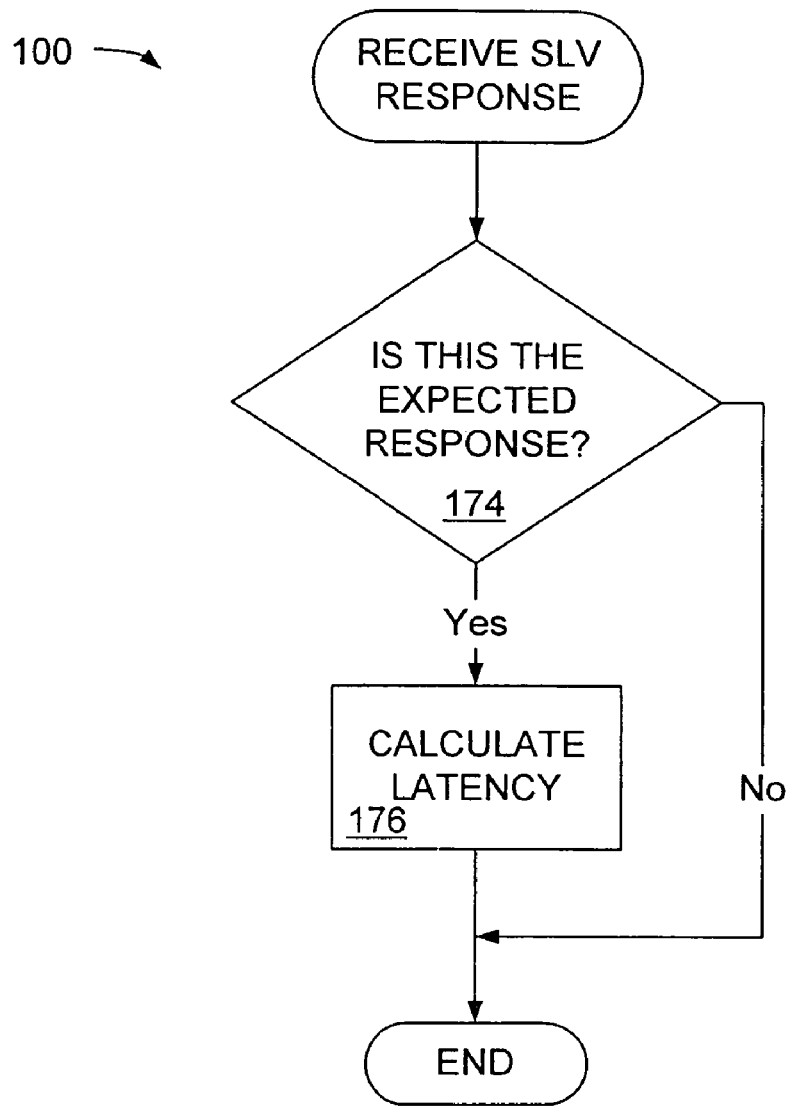
FIG. 8 is a flow diagram illustrating the operation of the service quality measurement logic of FIGS. 3 and 4 as applied to the receipt of an updated service level verification response message.

FIG. 8 is a flow diagram illustrating the operation of the service measurement logic of FIGS. 3 and 4 as applied to the receipt of an updated service level verification response message. Upon receipt of the service level verification response message from a far end communication device, the near end communication device will determine in decision block 174 whether the expected sequence has been received. If the expected response is received, then in block 176 the round trip latency is calculated and stored in the latency/interval storage device 109 in statistics database 48 of FIG. 4. The round trip latency is the time delay imparted to a message when traversing a communication network from an originating, or near end communication device, to a receiving, or far end communication device, and back. The round trip latency is calculated by subtracting the value of the near end transmit timestamp from the current system tick counter, accounting for timer wrap, which is the condition where a timer reaches its limit and begins recounting at zero.

Next, the far end DLCI number and the far end IP address are retained for display to a user or for retrieval by a network management system.

If in block 174 the expected response is not received, the process is ended.

It will be obvious to those skilled in the art that many modifications and variations may be made to the preferred embodiments of the present invention, as set forth above, without departing substantially from the principles of the present invention. For example, the principles of the service quality measurement detailed herein are equally applicable to other communication services such as, for example but not limited to asynchronous transfer mode (ATM). All such modifications and variations are intended to be included herein within the scope of the present invention, as defined in the claims that follow.

Therefore, the following is claimed:

1. A system for measuring network performance parameters of a communication network, the system comprising:
 a terminal device connected at an endpoint of the communication network, said terminal device configured to receive a service level verification request sent over a secondary communication channel in said communication network; and wherein said terminal device is further configured to calculate network performance parameters of said communication network based upon information contained within said service level verification request signal and to reply to said service level verification request by sending a service level verification response over said secondary communication channel, wherein said service level verification response contains information related to the service quality level of said communication network, wherein the calculated network performance parameters comprises at least one of lost frames and lost octets.

2. The system of claim 1, wherein the secondary communication channel is a virtual circuit.

3. The system of claim 1, wherein the secondary communication channel is a permanent virtual circuit.

4. The system of claim 1, wherein the secondary communication channel is a switched virtual circuit.

5. A system for measuring network performance parameters of a communication network, the system comprising:
 a terminal device connected at an endpoint of the communication network, said terminal device configured to receive an inquiry signal sent over a secondary communication channel in said communication network; and
 wherein said terminal device is further configured to calculate at least one of a first plurality of network performance parameters of said communication network based upon information contained within said inquiry signal and to reply to said inquiry signal by sending a reply signal over said secondary communication channel, wherein said reply signal contains information related to the performance of said communication network,
 wherein the at least one calculated network performance parameters includes at least one of lost frames and lost octets.

6. The system of claim 5, wherein the first plurality of network performance parameters comprises a number of frames discarded during a first predetermined time period and a number of octets discarded during a second predetermined time period.

7. The system of claim 5, further comprising a second terminal device, the second terminal device configured to:
 receive said reply signal; and
 calculate at least one of second plurality of network performance parameters of said communication network based upon information contained within said reply signal.

8. The system of claim 7, wherein the second plurality of network performance parameters comprises latency of the communication network and availability of a far end communication device.

9. The system of claim 8, wherein the availability of a far end communication device is based upon a data link connection identifier (DLCI) contained in said reply signal.

10. A device for measuring network performance parameters of a communication network, the device comprising:
 a microprocessor executing logics stored in a memory, the memory storing:
 logic configured to transmit a request over a secondary communication channel in the communication network, the request containing information related to the performance of the communication network;
 logic configured to receive, over the secondary communication channel, a reply to the request;
 logic configured to receive said reply signal and to calculate at least one of a plurality of network performance parameters of said communication network based upon information contained within said reply, wherein the device is connected at an endpoint of the communication network, wherein the at least one calculated network performance parameters includes at least one of lost frames and lost octets.

11. The device of claim 10, wherein the plurality of network performance parameters comprises latency of the communication network and availability of a far end communication device.

12. A system for measuring network performance parameters of a communication network, comprising:
 a first communication device configured to send an inquiry signal over a secondary communication channel in the communication network;
 a second communication device communicatively coupled to said first communication device, wherein said second communication device is configured to receive said inquiry signal, calculate at least one of a first plurality of network performance parameters of said communication network based upon information contained within said inquiry signal, and reply to said inquiry signal with a reply signal, wherein said reply signal contains information relating to the performance of said communication network;
 wherein the first plurality of network performance parameters comprises lost frames and lost octets and
 wherein said first communication device is further configured to receive said reply signal and calculate at least one of a second plurality of network performance parameters of said communication network.

13. The system of claim 12, wherein the second plurality of network performance parameters comprises latency of the communication network and availability of the second communication device.

14. The system of 12, wherein the secondary communication channel is a virtual circuit.

15. The system of 12, wherein the secondary communication channel is a switched virtual circuit.

16. A method for measuring network performance parameters of a communication network, the method comprising:
 receiving, in a terminal device connected at an endpoint of the communication network, an inquiry sent over a secondary communication channel in the communication network;
 calculating, in the terminal device, at least one of a first plurality of network performance parameters of the communication network based upon information contained within the inquiry;
 wherein the first plurality of network performance parameters comprises lost frames and lost octets and
 replying, in the terminal device, to the inquiry by sending a reply over the secondary communication channel, wherein said reply contains information related to the performance of said communication network.

17. A non-transitory computer readable medium encoded with a computer program for measuring network performance parameters of a communication network, the program comprising the steps of:
 transmitting, in a device connected at an endpoint of the communication network, a request over a secondary communication channel in the communication network, the request containing information related to the performance of the communication network;

receiving, in the device, a reply to the request over the secondary communication channel; and calculating, in the device, at least one of a plurality of network performance parameters of said communication network based upon information contained within the reply, wherein the at least one network performance parameters includes at least one of lost frames and lost octets.

18. The non-transitory computer readable medium encoded with the computer program of claim 17, wherein the plurality of network performance parameters comprises latency of the communication network and availability of a far end communication device.

* * * * *